G. LANE.
SUPPORT FOR LAWN TENNIS NETS OR THE LIKE.
APPLICATION FILED JUNE 23, 1910.
1,000,682.
Patented Aug. 15, 1911.
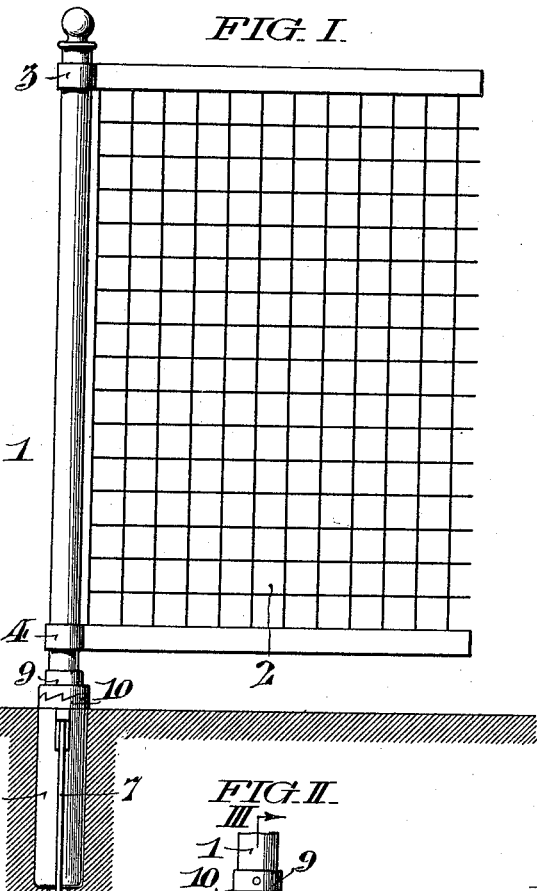
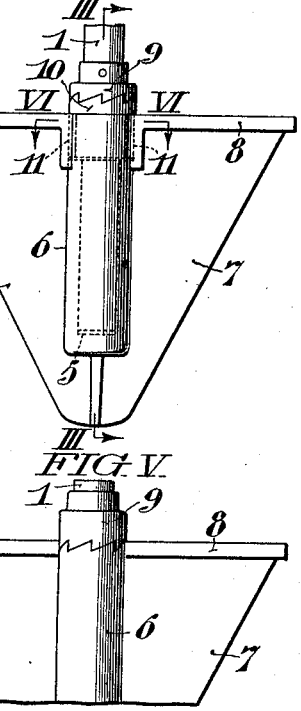
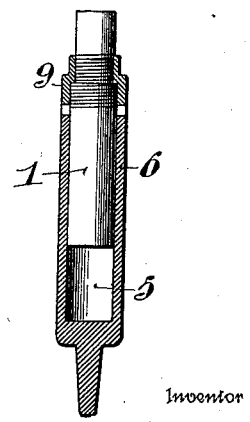
Inventor
George Lane,

UNITED STATES PATENT OFFICE.

GEORGE LANE, OF HAVERFORD, PENNSYLVANIA, ASSIGNOR TO EDER GUEST, ROBERT T. B. WINSKILL, AND GEORGE LANE, TRADING AS WOOD & GUEST, OF PHILADELPHIA, PENNSYLVANIA.

SUPPORT FOR LAWN-TENNIS NETS OR THE LIKE.

1,000,682.  Specification of Letters Patent.  Patented Aug. 15, 1911.

Application filed June 23, 1910. Serial No. 568,438.

*To all whom it may concern:*

Be it known that I, GEORGE LANE, of Haverford, in the county of Montgomery and State of Pennsylvania, have invented certain new and useful Improvements in Supports for Lawn-Tennis Nets or the Like, whereof the following is a specification, reference being had to the accompanying drawings.

An object of the invention is to provide a member to which the net may be attached, which member is capable of ready rotation, whereby the net may be wound thereon and stretched, together with means for holding the member in set position in order to maintain the net under tension.

A further object of the invention is to provide a device of the above character with a supporting base that is adapted to be embedded in the ground, so as to be substantially flush therewith, and with means for detachably and rotatably supporting the member to which the net is attached in said supporting base.

These and other objects will in part be obvious, and will in part be hereinafter more fully described.

In the drawings, Figure I, is a side view of a support with a tennis net attached thereto. Fig. II, is an enlarged detail of the supporting base and the lower part of the support for the net. Fig. III, is a section on the line III, III, in Fig. II. Fig. IV, is a view similar to Fig. III, showing a slightly modified form of the invention. Fig. V, is a side view of the base and the lower part of the support, showing the same construction as in Fig. IV. Fig. VI, is a section on the line VI, VI, of Fig. II. Fig. VII, is a perspective view of the support and attached ratchet collar. Fig. VIII, is a perspective view of the coöperative detachable ratchet collar.

In carrying out my invention, I have provided a support 1, which, as herein shown, is cylindrical, with an ordinary cap at the top thereof. A tennis net 2, is attached to said support at 3, and 4, in any suitable way, so that upon the rotation of the support 1, the said net will be wound on to the post and thus put under tension.

The support 1, is adapted to be inserted in a socket 5, formed in a supporting base 6. Said supporting base is provided with laterally extending wings 7, so that when said supporting base is embedded in the ground, the wings 7, will prevent said base from turning. Strengthening ribs 8, 8, extend laterally from the socket at the upper edges of the wings 7, 7, and are attached thereto. The wings 7, 7, as clearly shown in Fig. II, are tapered toward the lower end thereof, so that the supporting base may be readily driven into the ground, until the strengthening ribs 8, 8, are substantially flush with the surface of the ground.

In order to hold the supporting member 1, in various adjusted positions in the supporting base, and thus hold the net under tension, I have provided a collar 9, which is rigidly secured to the supporting member 1, in any desired way, and is provided on its under face with ratchet teeth. A collar 10, is adapted to engage the lower end of the supporting member 1, loosely, so that said supporting member may be rotated therein. This collar 10, carries projecting ribs 11, (see Figs. VI, and VIII), which are adapted to engage similarly shaped recesses in the supporting base, which prevents said collar 10, from rotating in the base. Said collar 10, is also provided with a shoulder 12, which rests on the upper face of the supporting base. On the upper surface of the collar 10, is a ratchet face which coöperates with the ratchet face on the under side of the collar 9.

The weight of the supporting member 1, will hold the ratchet faces interlocked. When it is desired to stretch the net, the support 1, is turned in a direction to wind the net on to the support, and the cam ratchet faces will slip one over the other and thus hold the support in any set position. The support 1, extends into the socket 5, sufficiently to allow the ratchet faces to pass one over the other. When it is desired to release the net, the support is lifted sufficiently to withdraw the interlocking ratchet faces, and the support may be then rotated in an opposite direction. When it is desired to take the net down, the support may be quickly raised from its supporting base, and the collar 10, also lifted from its seat in the supporting base, thus leaving nothing but the supporting base which is flush with the surface of the ground.

In Figs. IV, and V, I have shown the lower ratchet face as formed on the upper edge of the supporting socket, thus doing away with the detachable collar. The structure shown in these figures operates in precisely the same way as above noted. The collar 9, in Fig. IV, is shown threaded on to the support 1, and the lower end of said support is slightly enlarged.

It will be obvious that minor changes in the details of construction may be made, without departing from the spirit of my invention.

Having thus described my invention, I claim:—

1. A support for lawn tennis nets or the like, consisting of a supporting base having a socket formed therein, which supporting base is adapted to be embedded in the ground, a post rotatively mounted in said socket, and means for holding said post from turning under the tension of the net, said means including engaging devices having horizontally arranged cam faces and interlocking shoulders for preventing the turning of the post in one direction, relative to said supporting base.

2. A support for lawn tennis nets or the like, consisting of a supporting base having a socket formed therein, which supporting base is adapted to be embedded in the ground, a collar attached to said supporting base and having ratchet teeth on its upper face, a post rotatively mounted in said socket, a collar secured to said post, and having ratchet teeth on its lower face adapted to engage the ratchet teeth of the collar carried by the socket.

3. A support for lawn tennis nets or the like, consisting of a supporting base having a socket formed therein which supporting base is adapted to be embedded in the ground, a collar attached to said supporting base and having ratchet teeth on its upper face, a post rotatively mounted in said socket, a collar secured to said post and having ratchet teeth on its lower face adapted to engage the ratchet teeth of the collar carried by the socket, said supporting base having laterally projecting and downwardly tapering wings for preventing the turning of the supporting base in the ground.

4. A support for lawn tennis nets or the like, consisting of a supporting base having a socket formed therein, a post rotatively mounted in said socket, and means for holding said post from turning under the tension of the net, said means including collars having horizontally arranged cam faces and interlocking shoulders for preventing the turning of the post in one direction, one of said collars being secured to said post, and the other collar being removably seated in said base and being provided with means to prevent turning therein.

In testimony whereof, I have hereunto signed my name, at Philadelphia, Pennsylvania, this 22nd day of June, 1910.

GEORGE LANE.

Witnesses:
JAMES H. BELL,
E. L. FULLERTON.

---

Copies of this patent may be obtained for five cents each, by addressing the "Commissioner of Patents, Washington, D. C."